April 15, 1941.    L. N. CRICHTON ET AL    2,238,626
RELAY AND RELAY PROTECTIVE SYSTEM
Filed March 23, 1939    2 Sheets-Sheet 1
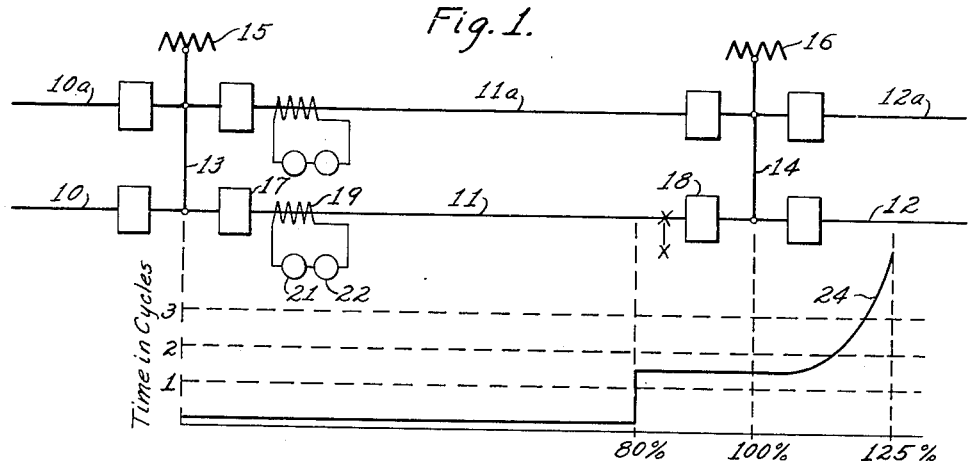
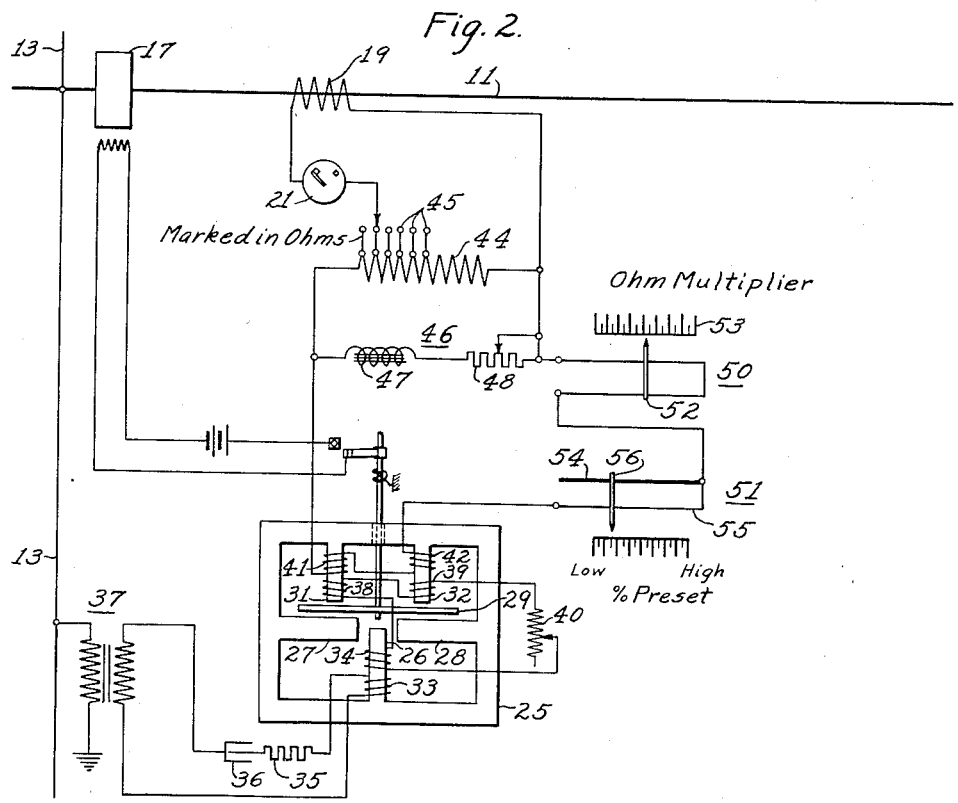
WITNESSES:
INVENTORS
Leslie N. Crichton and
George M. Barrow.
BY
ATTORNEY INVENTORS
Leslie N. Crichton and
George M. Barrow.

Patented Apr. 15, 1941

2,238,626

UNITED STATES PATENT OFFICE 2,238,626

RELAY AND RELAY PROTECTIVE SYSTEM

Leslie N. Crichton, Livingston, and George M. Barrow, Nutley, N. J., assignors to Westinghouse Electric & Manufacturing Company, East Pittsburgh, Pa., a corporation of Pennsylvania Application March 23, 1939, Serial No. 263,698

8 Claims. (Cl. 175—294)

This invention relates to relays and to relay protective systems, and particularly to a relay and a relay system for selectively protecting sectionalized alternating current railway systems.

Another object of the invention is to provide a relay and relay system for selectively distinguishing between a normal load condition and an abnormal or faulty condition, as a basis for controlling the isolation of a faulty section of the railway system upon the occurrence of a fault.

Another object of the invention is to provide a relay and relay system in which the operating or tripping point of the relay is automatically pre-set, or self-adjusted, according to varying load conditions in a circuit, or section, of an electric system, to which the particular relay is connected.

Another object of the invention is to provide a relay and relay system of the foregoing character in which an automatic pre-setting operation is effected by a simple and economical structure.

Railway trolley systems of the alternating current type are usually sub-divided into sections of parallel track circuits, which are supplied with energy at each end from a bus conductor that is energized from an adjacently disposed transformer. A circuit breaker is provided between the bus conductor and the adjacent end of each track circuit of the adjoining sections. The breaker serves, when opened, to disconnect that end of the circuit from the energizing source whenever it is necessary to isolate the circuit, upon the occurrence of a faulty condition in the circuit.

So long as the sections are sound, it is desirable to maintain them energized, so that energy will be available for the locomotives when they enter the territory served from those sections, thereby to maintain high speed operation. Upon the occurrence of a fault, such as a ground in any section of the circuit, it is therefore desirable to disconnect only that section which is defective, so that the remainder of the system will be available to maintain the locomotives of the system in operation as far as possible.

In order to selectively control the permitted continuity of connection of a system during normal conditions, and the necessary disconnection during abnormal conditions, it is necessary to be able to distinguish between normal load currents and abnormal currents caused by faulty conditions, in the sections. Where a section is a relatively long one, the impedance of a track circuit may be sufficiently high to reduce a short circuit current, through a fault at the far end of a circuit section, to a value below a normal load current taken by a locomotive at a near end of the section. It is therefore necessary to distinguish between load current conditions and fault current conditions, as a guide to controlling the isolation of a faulty circuit section, while permitting the continued operation of a sound section even though it is more heavily loaded than under fault conditions.

The relay protective system as we apply it, for such selective control, includes a high speed relay of the impedance type to protect a circuit section against a faulty condition that might develop within a predetermined distance from the interrupter, including approximately 80% of the length of the section. A second relay of the impedance type, but modified in accordance with the principles of our invention, is applied to protect the remaining 20% of the circuit section at the far end of the section.

In order to provide the selective action to distinguish between load conditions and fault conditions, we utilize a relay of the impedance type and modify its operation by means of a self-adjusting resistance element, whose resistance increases when heated by a current traversing it, and we dispose that resistance element in circuit with a current energized coil of the relay so that a greater amount of current will be required to operate the relay after that resistance element has been heated by a current corresponding to any normal load current. For one particular commercial application where our relay is employed, that resistance element consists of a nickel wire. Other metals having similar characteristics may also be used.

The relay circuit including the current winding and the nickel resistance element, is bridged by a by-pass circuit of relatively fixed impedance. As the resistance of the nickel element varies, the relay current distribution will vary between the current winding circuit and the by-pass circuit. Therefore, when a locomotive enters the associated section, a portion of the load current, measured through a current transformer, will heat the nickel wire resistor and will increase its resistance in circuit with the current winding of the relay. A much greater load current will then be necessary to provide sufficient current to energize the current winding to relay-operating condition, in view of the disproportionately modified relationship between the circuit including the current winding and the nickel resistor, and the by-pass circuit of relative stable unchanging character.

The manner in which the selective protection is achieved, and the construction and arrangement of the modified relay and the relay system which we provide for this purpose, are illustrated in the accompanying drawings, in which—

Figure 1 is a schematic showing of parallel track circuits of three adjacent sections, as protected by the two relays which we propose;

Fig. 2 is a schematic illustration of the various elements of a relay embodying the principles of our invention;

Figure 3:
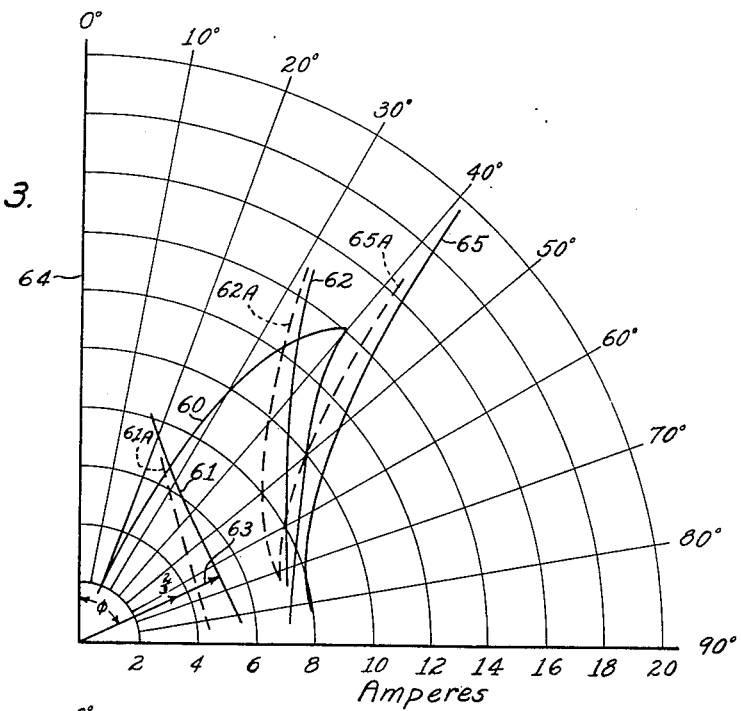
Fig. 3 is a vector diagram, using polar coordinates, illustrating the change in the relay settings with changes in load conditions in a relatively long line section.

As illustrated graphically in Figure 1, a trolley system is shown as including three adjacent sections 10, 11 and 12, that are connected to associated bus conductors 13 and 14, energized from transformers 15 and 16. Each section includes two or four parallel track circuits, such as 10a, 11a, 12a, so traffic may be shifted, when trouble occurs on one track, to an adjacent track. In this case, one line circuit section 11, is provided with two circuit breakers 17 and 18 between the respective ends of the section and the adjoining buses. The protective equipment for each end of each line section will be the same, and for that reason only the equipment adjacent to the circuit breaker 17 need be described in detail.

As illustrated in simple schematic arrangement in Fig. 1, a current transformer 19 provides the energizing current for two relays 21 and 22 that may be further respectively identified by their commercial names, as the MZ and the CZT relays manufactured and sold by the Westinghouse Electric & Manufacturing Company. The MZ relay 21 is essentially an impedance relay arranged for instantaneous or high speed operation. The CZT relay 22 is also a relay of the impedance type, and is modified in accordance with the principles of our invention, as herein disclosed, to provide the thermal load compensation to vary or adjust the operating point of the relay according to the load conditions at the particular time.

The instantaneous relay 21 is normally arranged to protect approximately 80% of the line section considered, from the end at which the relay is located, which in this case is adjacent the bus 13. Upon the occurrence of any fault within that 80% portion of the line section, the relay 21 will operate instantaneously to effect immediate high speed operation of the circuit breaker 17 to disconnect the circuit section 11 from the bus 13. Similar equipment adjacent the circuit breaker 18, at the other end of the section 11, will cause the operation of that breaker to disconnect that end of the circuit 11, thereby to isolate the circuit section 11 entirely upon the occurrence of a fault.

In order to provide selective protection for the remaining 20% of the line section at the far end of the line adjacent the bus 14, the modified impedance relay 22 is adjusted to respond to a faulty condition occurring in the system within a distance representing a space of approximately 125% of the line section; that is, the relay 22 is adjusted to respond to a faulty condition occurring in line section 11 and beyond the line section 11 into the line section 12, a distance corresponding to about 25% of the length of section 11. Such equivalent distances are determined and established by equivalent impedance values set up to control the relay operation, and are based upon the normal impedance value of the section to be protected.

In view of the portions of the line section allotted for protection to the respective relays, the high speed relay 21 will operate if the fault is within the 80% portion of the line section and will not operate if the fault is beyond that 80% portion. The modified relay 22 will start functioning upon the occurrence of a fault but will not operate until the time required for the expiration of at least one and one-half cycles after the occurrence of a fault. The numerals 1, 2, and 3 on the vertical dotted line adjacent the bus 13, in Fig. 1, represent time intervals corresponding to the number of cycles indicated by those numerals.

Thus, for a fault X occurring in section 11 between the first 80% portion and the end of the section 11 adjacent the bus 14, the relay 22 would operate, after a preliminary interval of one and one-half cycles, to open the circuit breaker 17 and to disconnect the section 11 from the bus 13. The breaker 18 will be opened by the high speed relay corresponding to relay 21 associated with the breaker 18. The relay 22 is arranged to operate according to the impedance or electrical length of the line section 11 plus the 25% of the section 11, in order to properly arrange the operating curve 24 of the time relay 22 for the type of protection that is wanted.

We may now proceed to consider the internal construction of the modified preset relay 22, as shown in Fig. 2. The relay magnet structure consists of a group of laminated stampings 25 having generally the construction shown, with one vertical pole piece 26 and two horizontal pole pieces 27 and 28 below a rotatably mounted disc 29, and with two vertically disposed pole pieces 31 and 32 above the disc 29.

Two windings 33 and 34 are disposed around the lower vertical pole piece 26. The winding 33 is a voltage winding that is energized, through a resistor 35 and a condenser 36, from a potential transformer 37 whose primary winding is connected between the bus 13 and ground. The voltage winding 33 on the relay pole piece 26 operates as, and constitutes, a primary transformer winding with relation to the winding 34 as a secondary winding.

A split auxiliary winding, consisting of two parts 38 and 39 on the upper pole pieces 31 and 32, is connected to the secondary winding 34 on the lower pole piece 26, through an adjusting resistor 40 to provide a flux in the upper pole pieces 31 and 32 that will cooperate with the flux in the lower pole piece 26 to establish a restraining bias, or torque, in the relay that will tend to hold the disc in contact-open position. After the relay adjustment is made, the adjustment of resistor 40 is made permanent.

A second pair of split windings 41 and 42 on the upper pole pieces 31 and 32 are connected in series to constitute the current winding of the relay, and they are disposed to be differentially effective with respect to the associated split auxiliary windings 38 and 39. Thus, when the current winding 41—42 is energized to a sufficient extent to overcome the magnetizing effect of the auxiliary voltage windings 38 and 39, the relay will be energized to move the relay disc to contact-closing position, and the time element will depend upon the product of the differential flux effects of the top pole pieces, due to the current winding, and the flux effect in the bottom pole pieces due to the voltage winding.

The current winding 41—42 is energized from the current transformer 19 in the line section 11 through an auto-transformer 44. The auto-transformer 44 is provided with adjustment taps 45, by means of which the amount of current supplied to the relay, and its circuits, may be adjustably modified according to the length, measured as impedance, of the line section 11 that is to be protected.

An impedance shunt 46, including a reactor element 47 and a resistor element 48, is connected across the circuit including the current winding 41—42 to provide a by-pass circuit around the current winding.

The reactor 47 contains iron which will saturate at very heavy short circuit currents to decrease the ohmic reactance of the reactor and by-pass a still greater portion of the load current to prevent the relay from burning out on short circuits close to the adjacent bus-bar. In the usual normal operation, this relay is mainly concerned with short circuits that occur at the far end of the line and consequently draw a small current due to the impedance of the line.

The circuit including the current winding 41—42, around the shunt 46, also includes an adjustable calibrating resistor 50, and a resistor combination 51 that is initially adjustable for the proper cold setting of the relay and that is automatically self-adjusting during operation to modify the setting of the relay according to prevailing load conditions.

The resistor 50 is provided with an adjusting slide contact 52 and a scale 53, and serves as a vernier or close adjustment to adjust the relay setting for operation according to the ohmic impedance of the line. The auto-transformer 44 and its taps 45 provide rough adjustments to establish proportional relay energization for approximate values of the line impedances, and the adjustable resistor 50 serves as a means to provide the close adjustments to modify the closest reading that is possibly available with the taps 45, in order to provide the desired ohmic impedance adjustment of the relay to correspond to the ohmic impedance of the line section 11.

The resistor combination 51 includes two resistance wires 54 and 55 that have the same ohmic resistance when cold, that is, when at normal average ambient temperature. The wire 54 has a negligible temperature coefficient of resistance so its resistance will not be affected by the relay current. The wire 55 is a relatively fine nickel wire of 0.20 inch diameter in order to be heated by the current in the current coil circuit, so that the resistance of the wire 55 will be modified. Any wire may be employed that has a positive temperature coefficient of resistance, and the nickel wire is merely illustrative. An adjustable slide 56 contacting both wires 54 and 55 serves as a bridging connection therebetween and the slide is adjustably and selectively located when the relay is first placed in operation, in order to provide a certain percentage of preliminary preset in the relay. That means that the relay is energized in a manner corresponding to a light load on the system so that the relatively large rate of current increase in the circuit when the section is first loaded will not establish too great an operating action on the relay.

During operation, when there is no load on the section 11, the relay will not be energized and the nickel wire 55 will therefore be cold, and at its minimum resistance. Upon the occurrence of a faulty condition at a point beyond the 80% distance from the bus 13, as indicated by an attendant dropping of the voltage at the bus and through the potential transformer 37, the relay would be energized in a direction to cause its contacts to energize the trip circuit of the breaker 17, and, after an interval of time corresponding to the operation of the disc 29 of the relay, its contacts would close and complete the trip circuit to open the breaker 17.

If a proper normal load should be imposed upon the line section 11 at the beginning of the operation of the relay, the secondary current from the current transformer 19, as modified by the auto-transformer 44, would be sub-divided between the by-pass inductive shunt 46 and the current coil circuit for the relay including the presetting resistor combination 51. After a short interval, the portion of the nickel resistor 55 in the current coil circuit would become heated to an extent corresponding to the amount of current traversing that resistor and its resistance would be correspondingly modified. As a result, the resistance of the circuit including the current winding 41—42 would be increased and the current through that winding would be disproportionately diminished with respect to the current through the by-pass shunt 46. The increase in the resistance of the nickel wire 55 would thus increase the resistance of the current coil circuit and would require that a greater voltage be applied to that circuit to energize the current winding sufficiently to over-balance the flux in the auxiliary voltage winding 38—39. The amount of current in the load section 11 would therefore have to be proportionately enlarged to provide the increased current necessary in the current winding to cause operation of the relay.

Thus, the presence of a normal load in the section 11, and the incidental presence of a normal current through the relay, will heat the resistor 55 sufficiently to diminish the effectiveness of the current winding, and, therefore, will require a proportionately greater load current to cause operation of the relay than the original setting required.

In this manner, the operating point of the relay is continuously adjusted and preset according to the normal load condition, so that a proportionately greater current will be necessary to operate the relay when a normal load is already present on the line section 11.

In view of the impedance characteristics of the line section, a fault current in that section will have a definite fixed power factor or angle of lag behind the voltage of the system.

In order to procure further selective action of the relay in distinguishing between normal load current and fault currents, the arrangement of elements that we have just described provides a presetting characteristic for the relay, that shifts the locus of the operating points of the relay in such manner as to require only a relatively small increment of fault current, over the normal load current, to operate the relay, while at the same time requiring a relatively large increment of load current, over the prevailing load current, to effect operation of the relay.

In order to provide the maximum selectivity in the relay, the angular position of the voltage applied to the relay is shifted to a position at right angles to the relay current corresponding to a fault current that might occur in the section circuit.

For example, if the impedance characteristics of the line section is such that a fault current would have a power factor of sixty-three degrees lagging, as was the case in one actual installation of this relay system, the voltage applied to the voltage winding 33 of the relay would be shifted by the resistor 35 and the condenser 36 to a position leading the normal voltage by an angle that would place the voltage on the coil 33 at right angles to a fault current. Since the relay has voltage and current windings, it is essentially a watt relay, and the maximum torque is developed in the relay when the voltage flux and the current flux are at right angles. For that reason, the phase angle of the applied voltage is set to provide such maximum torque when the relay is energized by a fault current.

In that manner, selective action is procured in the relay, since smaller torque will be developed by a normal load current, which will have a higher power factor than the fault current. Consequently a much greater load current would be necessary to operate the relay.

Figure 4:
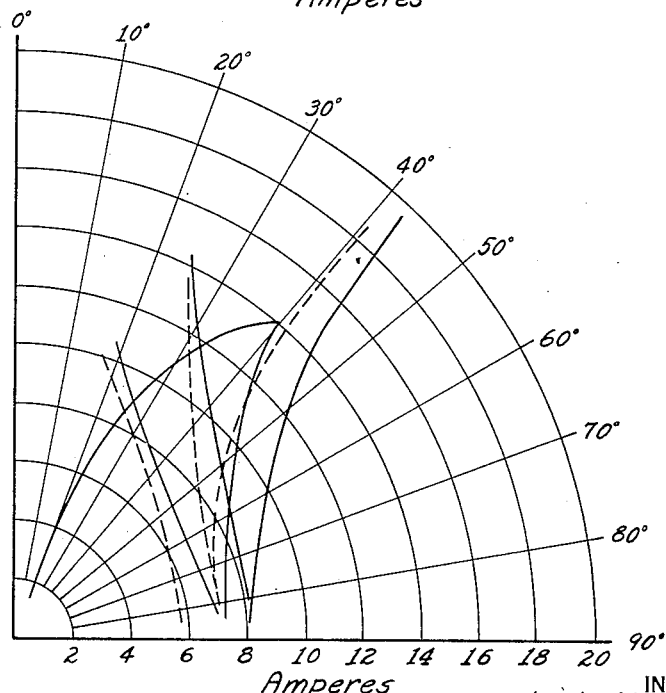
Fig. 4 is a similar diagram for a medium length line section.

The manner in which the relay operates to provide this feature of selective control is illustrated in Figs. 3 and 4. The normal load area for a long line section, as in Fig. 3, is included within the area outlined by the curve or envelope 60. When there is no load on the section 11, the current winding of the relay will not be energized and the load compensating preset element 55 will be relatively cold and have a low resistance. Under such conditions, the relay will have no preset characteristic other than the small bias preset previously mentioned. At this time, the locus of the operating points of the relay is indicated by the line 61 which constitutes the locus of load current values that will cause operation of the relay at normal system voltage. The dotted line 61A is the corresponding locus at a sub-normal system voltage, for example, of 80 volts on the secondary of the potential transformer, as against 110 volts for the normal secondary voltage.

Upon the entrance of a locomotive as normal load upon the section 11, the relay will be energized to an extent that will cause the load compensating preset wire 55 to become heated in proportion to the load. With increase of load to substantially full load for the section, the locus of the operating points of the relay shifts from the location of the curve 61 to the location indicated by line 62 at full load voltage corresponding to 110 volts on the secondary of the voltage transformer. The curve 62A represents the locus of the operating points of the relay for sub-normal voltage of the system, corresponding to about 80 volts on the voltage transformer secondary. The impedance of the section 11, corresponding to a represenative commercially installed system, is such that a fault current will have a power factor corresponding to an angle of lag of about 63°, as indicated by the line 63, representing the location of the fault current with respect to the vertical polar axis 64, as the normal voltage line of the system.

It will be observed that the lower end of the pre-set locus 62 is displaced a short distance from the locus 61 along the axis of the fault current line 63, whereas the upper end of the locus 62 is shifted to approximately twice that short distance away from the locus 61. Thus, after the section 11 is loaded by a locomotive drawing energy, the relay will be operated by a proportionately smaller increase of fault current than of load current.

This action in the relay is achieved by the phase-angle adjustment of the voltage impressed upon the relay by the resistor 35 and the condenser 36, so the maximum torque will be developed when the relay current lags sixty-three degrees, which is the known power factor of a fault current, as previously explained. A load current, however, having a lower power factor, or greater angle of lag, must be proportionately larger to provide the amount of current for the current winding necessary to energize the relay to operating condition.

As the load continues gradually to increase, the location of the locus of the operating points of the relay continues to shift more and more to the right, to a position arbitrarily represented by the solid line 65 for the full system voltage, and represented by the broken line 65A for sub-system voltage.

When the operation locus is at the position of curve 65, an increase of the value of the load current alone to that locus is intended to be sufficient to trip the relay, since the large current for that load might conceivably damage the trolley wires by overheating and de-temperating them.

Thus, the position of the locus of the operating points of the relay is governed by two controls. The initial position of this locus, so far as the slope of the locus is concerned, is controlled by the phase-angle adjustment of the voltage coil circuit by the resistor 35 and the condenser 36. Thereafter, the position and the slope of the locus are modified by the pre-set resistor wire, as it changes the resistance of the current coil circuit, to vary the proportional part of the main circuit current supplied to the current coil, and, thereby to vary the influence of the load current upon the relay.

The phase-angle adjustment of the voltage coil circuit holds the lower end of the locus, at the sixty-three degree line of a fault current, closer to the point of origin of the polar chart, and the watt characteristic of the relay as modified by the pre-set resistor shifts the upper end of the locus farther away from the point of origin of the chart. This feature is important since it dis-proportionately increases the relay setting for load currents, while increasing the relay setting, over the existing load, to respond to only a small current increment that might be caused by a fault.

By means of the arrangement herein illustrated, the relay is able to distinguish between a normal load condition and a faulty condition in a system of this type, thereby to selectively permit the continued connection, or to effect the disconnection, of a circuit section is merely loaded with normal load or abnormally affected by a fault.

The curves in Fig. 4 are for conditions similar to those described in Fig. 3, except as they occur in a medium length section. The horizontal base line represents the current in the secondary winding of the current transformer 19 which is directly proportional to the current in the circuit 11.

Our invention is not limited to any specific details of construction or of circuit arrangements that are illustrated, since they may be variously modified without departing from the spirit and scope of the invention as set forth in the appended claims.

We claim as our invention:

1. A protective system for an electrical distribution system comprising the combination with a load circuit provided with a circuit interrupter, of a relay of the impedance type provided with a main voltage winding to be energized according to the voltage of the circuit, an auxiliary voltage winding cooperating with the main voltage winding to establish a torque to bias the relay against operation, a current winding to be energized from and according to a portion of the current of the circuit and cooperative with the voltage winding to operate the relay, and means in circuit with the current winding for automatically modifying the resistance of that circuit and, hence, the degree of energization of the current winding, to control the operating setting of the relay, after a time interval following a change in the energization of the current winding.

2. An impedance relay of the induction disc type, comprising a magnetizable field magnet structure, an angularly movable armature disc in the path of, and subject to, the flux of the field magnet structure, a main voltage coil on the magnet structure to establish a flux according to a measured voltage, an auxiliary voltage coil on the magnet structure and energized by a transformer circuit from the main voltage coil and operative to establish a flux cooperative with the flux of the main voltage coil to establish a restraining bias on the disc against relay operation, a current winding on the magnet structure to establish a flux to cooperate with the flux of the main voltage coil to establish an operating torque on the disc, and a resistor in circuit with the current winding, having a resistance which varies in accordance with the magnitude of the current traversing said current winding.

3. An impedance relay of the induction disc type, comprising a magnetizable field magnet structure, an angularly movable armature disc in the path of, and subject to, the flux of the field magnet structure, a main voltage coil on the magnet structure to establish a flux according to a measured voltage, an auxiliary voltage coil on the magnet structure and energized by a transformer circuit from the main voltage coil and operative to establish a flux cooperative with the flux of the main voltage coil to establish a restraining bias on the disc against relay operation, a current winding on the magnet structure to establish a flux to cooperate with the flux of the main voltage coil to establish an operating torque on the disc, and a resistor having a positive temperature coefficient of resistance connected in series with the current winding.

4. An impedance relay of the induction disc type, comprising a magnetizable field magnet structure, an angularly movable armature disc in the path of, and subject to, the flux of the field magnet structure, a main voltage coil on the magnet structure to establish a flux according to a measured voltage, an auxiliary voltage coil on the magnet structure and energized by a transformer circuit from the main voltage coil and operative to establish a flux cooperative with the flux of the main voltage coil to establish a restraining bias on the disc against relay operation, a current winding on the magnet structure to establish a flux to cooperate with the flux of the main voltage coil to establish an operating torque on the disc, a self-varying resistor in series with the current winding, and a by-pass shunt connected in parallel across the current winding and the resistor in series.

5. An impedance relay of the induction disc type, comprising a magnetizable field magnet structure, an angularly movable armature disc in the path of, and subject to, the flux of the field magnet structure, a main voltage coil on the magnet structure to establish a flux according to a measured voltage, an auxiliary voltage coil on the magnet structure and energized by a transformer circuit from the main voltage coil and operative to establish a flux cooperative with the flux of the main voltage coil to establish a restraining bias on the disc against relay operation, a current winding on the magnet structure to establish a flux to cooperate with the flux of the main voltage coil to establish an operating torque on the disc, and a by-pass shunt to be connected to an external current source and paralleling the current winding to establish a predetermined relation between the current through that winding and the current in the auxiliary voltage winding.

6. An impedance relay of the induction disc type, comprising a magnetizable field magnet structure, an angularly movable armature disc in the path of, and subject to, the flux of the field magnet structure, a main voltage coil on the magnet structure to establish a flux according to a measured voltage, an auxiliary voltage coil on the magnet structure and energized by a transformer circuit from the main voltage coil and operative to establish a flux cooperative with the flux of the main voltage coil to establish a restraining bias on the disc against relay operation, a current winding on the magnet structure to establish a flux to cooperate with the flux of the main voltage coil to establish an operating torque on the disc, and a by-pass shunt to be connected to an external current source and paralleling the current winding to vary the magnitude of the current through the current winding to establish a variable flux opposite to that of the auxiliary voltage winding.

7. An impedance relay of the induction disc type, comprising a magnetizable field magnet structure, an angularly movable armature disc in the path of, and subject to, the flux of the field magnet structure, a main voltage coil on the magnet structure to establish a flux according to a measured voltage, an auxiliary voltage coil on the magnet structure and energized by a transformer circuit from the main voltage coil and operative to establish a flux cooperative with the flux of the main voltage coil to establish a restraining bias on the disc against relay operation, a current winding on the magnet structure to establish a flux to cooperate with the flux of the main voltage coil to establish an operating torque on the disc, and a by-pass shunt to be connected to an external current source and paralleling the current winding to vary the magnitude of the current through the current winding to establish a variable flux opposite to that of the auxiliary voltage winding, and a resistor having a positive temperature coefficient of resistance connected in series with the current winding.

8. A protective relay of the impedance type for protecting an electric system, comprising a magnetizable field magnet structure, a voltage winding on the magnet structure to be energized according to the voltage of the system and to establish a flux in said structure, a condenser in series with said voltage winding to control the phase angle of the flux generated by the said voltage winding, a current winding on the magnet structure, and a shunt in parallel with the current winding to control the current in the current winding and hence the flux established thereby, and resistance means in circuit with the current winding, said means having a positive temperature coefficient of resistance and being responsive to the current value for modifying the current distribution between the current winding and the shunt.

LESLIE N. CRICHTON.
GEORGE M. BARROW.